Nov. 1, 1932.  F. KLENTZER  1,885,729
WHEEL CONSTRUCTION
Filed Dec. 11, 1931   2 Sheets-Sheet 1
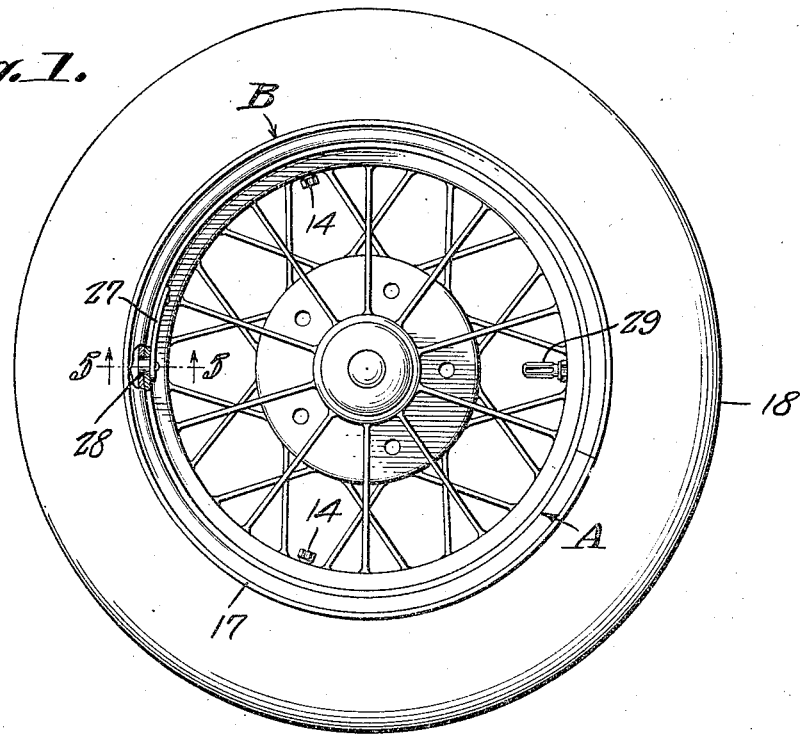
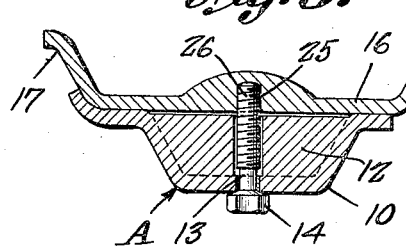
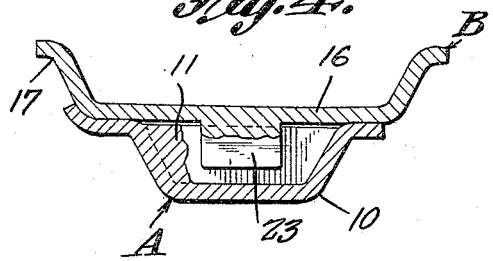
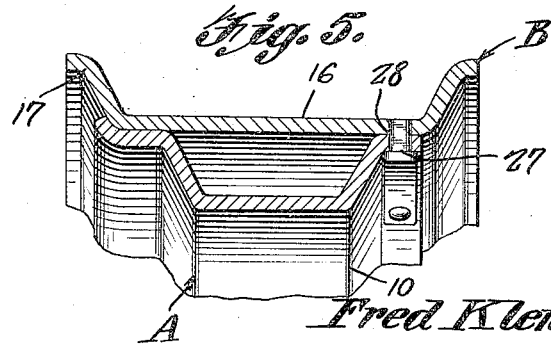
Fred Klentzer,
INVENTOR
BY Victor J. Evans & Co.
ATTORNEY Nov. 1, 1932.                F. KLENTZER                1,885,729
                            WHEEL CONSTRUCTION
                          Filed Dec. 11, 1931        2 Sheets-Sheet 2
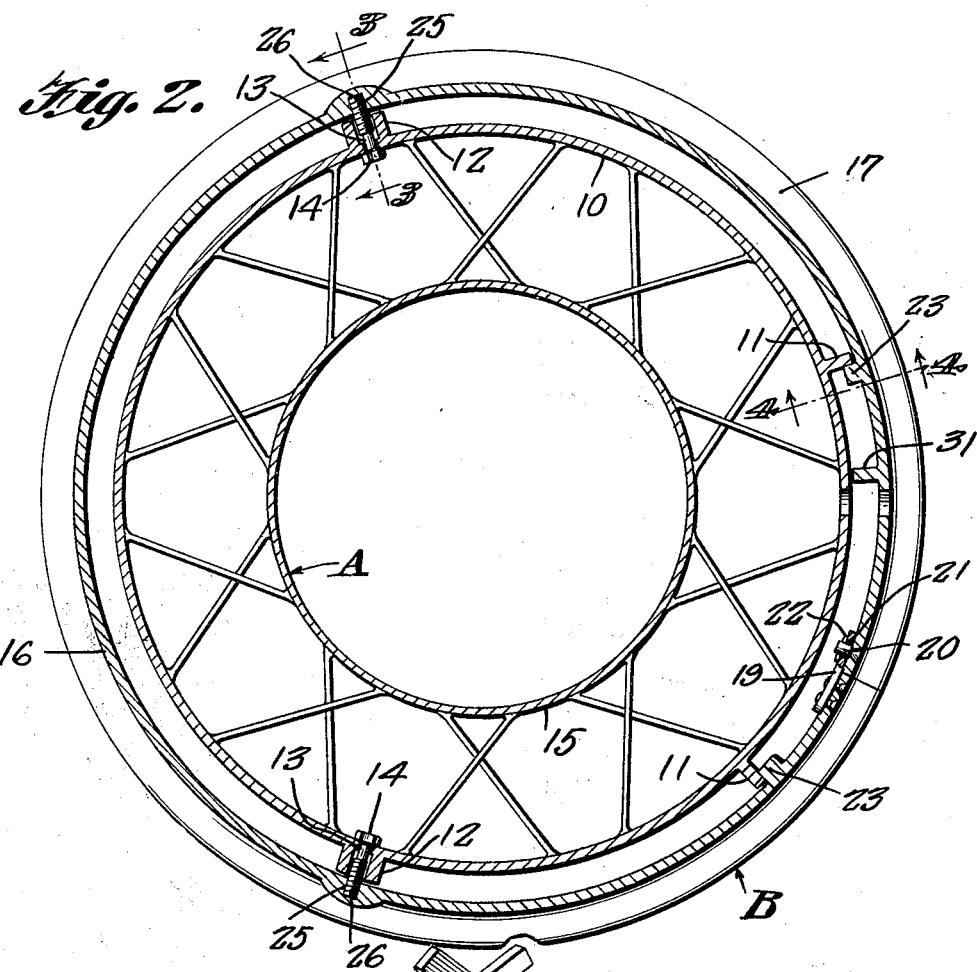
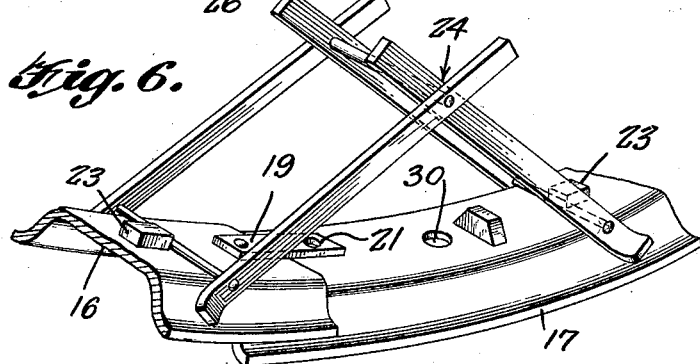
Fred Klentzer,
INVENTOR Patented Nov. 1, 1932

1,885,729

UNITED STATES PATENT OFFICE

FRED KLENTZER, OF LA FAYETTE, INDIANA

WHEEL CONSTRUCTION

Application filed December 11, 1931. Serial No. 580,458.

The invention relates to a wheel construction and more particularly to a wire wheel having a demountable rim.

The primary object of the invention is the provision of a structure of this character wherein the wheel felly is of a make-up so that a demountable rim can be firmly and securely held thereon and such rim readily removed for replacement with dispatch and ease, the rim being of novel construction so that a pneumatic tire carried thereby can be conveniently removed therefrom in the event of the puncture or other damage to said tire for repair purposes.

Another object of the invention is the provision of a structure of this character wherein the demountable rim is in the form of a transversely split annulus and is susceptible of contraction and expansion and on contraction will permit the mount of a tire thereon and when expanded this rim can be readily secured upon the felly of the wheel, the manner of the fastening of the rim to the felly being of novel form.

A further object of the invention is the provision of a structure of this character which is comparatively simple in construction, thoroughly reliable and efficient in its purpose, readily and easily handled for the mounting and demounting of the rim on and from the wheel, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 1 is a side elevation of a wheel constructed in accordance with the invention showing the demountable rim thereon and carrying a pneumatic tire, the felly and rim of the wheel being broken away to show detailed adjuncts.

Figure 2 is a vertical sectional elevation on an enlarged scale with the pneumatic tire removed from the rim.

Figure 3 is a sectional view on the line 3—3 of Figure 2 looking in the direction of the arrows.

Figure 4 is a sectional view on the line 4—4 of Figure 2 looking in the direction of the arrows.

Figure 5 is a sectional view on the line 5—5 of Figure 1 looking in the direction of the arrows.

Figure 6 is a fragmentary perspective view of the rim removed from the wheel and in contracted position with a spreader tool associated therewith.

Similar reference characters indicate corresponding parts throughout the several views in the drawings.

Referring to the drawings in detail A designates generally a wire spoked wheel having the annular externally channeled felly 10 for the support of a demountable rim B, the details of the felly 10 of the wheel A and the demountable rim B being hereinafter set forth.

The felly 10 has formed in its channel abutment lugs 11, these being spaced the required distance apart circumferentially of said felly while at certain locations within the said channel of the felly are tubular projections 12 having loose therein and guided thereby securing bolts 13, these being loosely passed through said felly 10 at the inner periphery thereof and are formed with wrench engaging heads 14, the bolts 13 being radially disposed relative to the center of the hub 15 of the wheel A and serve to detachably mount the rim B upon the felly in a manner presently described.

The rim comprises a contractible and expansible transversely split annulus 16 having the side flanges 17 as usual for engagement with the bead of a pneumatic tire casing 18 of standard construction when carried upon the rim. One end of the annulus 16 at its transverse split therein has riveted or otherwise fixed to the face thereof following the inner periphery of said annulus an ear or keeper extension 19 adapted to bridge the split to overlap the other meeting ends of the annulus 16 when the same is contracted to bring the said ends at the split in abutting matched relation to each other and this ear or extension 19 receives a lug 20 permanently fast in the other end of said annulus and projected from the face thereof following the inner periphery of the same, the ear extension 19 being provided with a suitable hole 21 for accommodating the lug 20. The lug is constructed to detachably receive a cotter pin 22 so that the ear or extension 19 can be made fast in its coupling engagement with the lug 20 and thus the said rim B will be sustained expanded for the demounting thereof upon the felly 10 of the wheel A as well as retaining the mounting of the casing 18 of a pneumatic tire upon said rim.

The rim B has formed on its annulus 16 at its inner periphery abutment lugs 23 which cooperate with the lugs 11 on the felly so as to prevent the creeping of the rim B when engaged about the felly 10, the lugs 23 on the mounting of the rim B contact with the lugs 11 of said felly 10 as is clearly shown in Figure 2 of the drawings. These lugs 23 on the rim, that is, the annulus 16, permit the engagement with said lugs of a spreader tool 24 so that when the annulus 16 is contracted with the ends at the split thereof overlapped the spreader tool 24 can be operated to expand the annulus 16 for the engagement of the ends of the same with each other to align the ends and fasten the rim expanded.

The rim B has at the outer side of the annulus 16 internally threaded sockets 25, these being adapted to open through the inner periphery of the annulus and detachably receive therein the threaded portions 26 of the bolts 13 so that the rim B will be made secure upon the felly 10 of the wheel A for demounting of said rim.

Carried by the felly 10 close to its outside edge is a spring latching dog 27 adapted for detachable engagement in the annulus 16 forming the rim B, the annulus having a suitable hole or opening 28 for registration with a clearance for the dog 27 and accommodates the latter.

To mount or demount a tire upon the rim B the annulus 16 at the transverse split is separated so that the ends adjacent each other and in normal abutting relation will overlap one another thus contracting the annulus 16 and in this fashion permitting the removal of the tire casing 18 therefrom. On the mounting of the tire casing 18 upon the rim B and to make the same secure the said annulus 16 is expanded by the tool 24 to bring the ends at the split in the annulus in alignment and abutting each other whereupon the ear or extension 19 is coupled with the lug 20 and the cotter pin 22 engaged in the latter to secure said extension or ear. Thereupon the rim B carrying the tire is placed upon the felly 10 of the wheel A with the lugs 11 and 23 of these engaged with each other and thereafter the bolts which have been released from engagement with the rim are fastened in the sockets 25 therefor by having the threaded ends 26 screwed into these sockets and thus the tire is made fast and likewise the rim B upon the wheel and finally the dog 27 will be moved to snapping engagement in the hole 28 therefor and thus the rim B further secured to the felly 10 of the wheel A.

In the mounting of the tire upon the rim the valve stem 29 is insertable in the hole 30 therefore in the annulus 16 as should be obvious.

The felly annulus 16 has provided thereon a spacer 31 to engage in the channel in the felly B of the wheel A which spacer with the projections 12 hold the rim B concentric to the felly 10 when thereon.

What is claimed is:—

The combination of a channeled felly, a rim removably carried thereby and having threaded sockets, tubular projections at intervals inside the channel, said felly having openings registering with the projections, headed bolts removably received in the projections through the openings in the felly and adapted for detachable engagement in the sockets in the rim, and cooperative lugs distributed about the felly and rim to properly locate the rim with the sockets in alignment with the openings in the felly whereby the bolts in said felly may be detachably engaged in the sockets in the rim.

In testimony whereof I affix my signature.

FRED KLENTZER.